United States Patent Office 3,459,496
Patented Aug. 5, 1969

3,459,496
PROCESS FOR THE RECOVERY OF POTASSIUM FROM MOTHER AND WASTE LIQUORS OF THE TREATMENT OF POTASSIUM SALTS
Alberto Scarfi and Emanuele Gugliotta, Siracusa, Italy, assignors to Sincat-Soc. Industriale Catanese S.p.A., Palermo, Italy, a corporation of Italy
No Drawing. Filed Jan. 27, 1965, Ser. No. 428,533
Claims priority, application Italy, Jan. 30, 1964, 2,017/64
Int. Cl. C22b 27/00
U.S. Cl. 23—50                     3 Claims

ABSTRACT OF THE DISCLOSURE

A method for recovering metastable kainite or langbeinite from the final liquors and other aqueous wastes of processes for the recovery of potassium from minerals containing same, the liquid having a potassium concentration, as the chloride, as little as 4 moles per 1000 moles of solution, whereby, without evaporation, the desired salt is precipitated at a temperature between 60° C. to 80° C. for kainite and upwardly of 80° C. for langbeinite after sufficient magnesium sulfate has been added to produce the salt, but in an amount not more than 30 moles of magnesium sulfate per 1000 moles of water, seed kainite or langbeinite being supplied to establish a crystal pattern. The salts are recovered without evaporation.

Our present invention relates to a process for the recovery of potassium from the mother liquors and waste liquids, brines and the like resulting from the treatment of potassium salts and, more particularly, from the treatment of potassium-containing minerals to recover potassium salts therefrom.

It has become a common practice to recover from naturally occurring minerals containing potassium, relatively valuable potassium salts and especially potassium chloride (KCl) and sulfate ($K_2SO_4$); also processed similarly are: complex or composite potassium salts produced as byproducts or other processes, and minerals subjected to calcination or other treatment before processing to modify their physical or chemical structures. The problem toward which the present invention is directed is the recovery of potassium in the form of usable potassium compound from the waste and mother liquors of these processes and other systems in which potassium is to be found in solution and must be recovered. There are, however, several processes known for the removal of potassium compounds or the potassium ion from solution. These processes include treatment of the mother or waste liquors with organic reactants forming insoluble compounds with potassium, such compounds precipitating from the solution and being recovered. The obvious difficulty with this system is that the organic constituents employed are relatively expensive and cannot be used either on a large scale or for the treatment of liquids having low potassium constituents with any efficacy. Another system, presently used but only to a limited extent, involves the concentration of the brine by evaporation and its subsequent precipitation of potassium as one of its simple salts or a double salt. Not only is this process uneconomical because of the need to treat large quantities of solution when the potassium concentration is small, but the product obtained is not always equivalent to the most useful products in further treatments for the separation of valuable potassium salts from the more complicated double salts, mixtures of double salts or even more complex compounds.

It is therefore, the principal object of the present invention to provide a method of recovering relatively large quantities of potassium from the mother and waste liquors of industrial processes without the need for concentration or reduction of the solution volume.

Still another object of this invention is to provide a process for the removal of potassium from solutions in which it is present only in relatively small quantities but in such form as to render the potassium amenable to further treatment for recovery of potassium compounds.

We have discovered that common considerations regarding the solubility product of the various potassium salts of ionic species within a potassium-containing solution notwithstanding, it is possible to extract a large portion of the potassium component of a solution of the character described in the form of economically suitable and highly valuable double salts with the aid of magnesium-sulfate compounds which normally would be expected only to go into solution under the indicated conditions or, at most, to remain as a sollid phase. The discovery that a solid phase is produced by the process of the present invention as a valuable potassium-containing double salt, is indeed surprising inasmuch as one would not expect any precipitation of a potassium compound under these operating conditions.

The present invention, in its essentials, resides in the addition to a brine having relatively low potassium content, especially when compared with the overall salt or ion content, of a magnesium sulfate at a temperature equal to or greater than 60° C. The magnesium sulfate of the resulting brine or liquor can be present in an amount greater than that added during the treatment by virtue of the prior existence of magnesium sulfate in solution, but is of a concentration which can be less than its saturation concentration so that one normally would not expect the precipitation of a magnesium-sulfate phase from the solution. Depending upon the temperature employed, it is possible to recover from the liquid, langbeinite ($K_2SO_4 \cdot 2MgSO_4$) or kainite ($KCl \cdot MgSO_4 \cdot 2.75H_2O$), especially when the precipitation of the respective solid is promoted by placing the respective mineral as a solid phase in contact with the liquid for a digestion period of at least several minutes, preferably between 5 minutes and 1.5 hours. A longer conditioning time changes the character of the precipitated solid. As indicated earlier, magnesium sulfate is added to the solution which previously contained potassium ion and either the sulfate ($SO_4^{--}$) and chloride ($Cl^-$) ions in the aqueous medium in such concentrations that the existence of the solid phase could not be predicted from the solubility products of the minerals and the theory of saline equilibrium of the five components $K^+$, $Na^+$, $Mg^{++}$, $SO_4^{--}$, $Cl^-$, which are present in addition to water. The concentrations will, however, be sufficient to precipitate the mineral in the presence of the seeding mass of the identical mineral, this mass apparently determining the structure of the precipitate. It should be noted that the theory of saline equilibrium predicts the presence of langbeinite as a solid phase in the solution at a temperature of 110° C., only in cases in which the magnesium-sulfate content is less than 3 moles per 1000 moles of water when the magnesium chloride concentration ($MgCl_2$) is 80 moles per 1000 moles of water, or when the magnesium-sulfate concentration is 15 moles per 1000 moles of H₂O at a magnesium-chloride concentration of 20 moles of magnesium chloride per 1000 moles of H₂O. In contrast, the present invention is capable of operating at magnesium-sulfate concentrations higher than those permitted by the usual equilibrium conditions and even concentrations ranging up to 30 moles of magnesium sulfate per 1000 moles of water.

The brines and waste liquors treated according to the present invention, can have relatively low potassium concentrations, i.e., as low as 4 moles of $K_2Cl_2$ or 8 moles of KCl per 1000 moles of water. When the precipitation is carried out at temperatures below 80° C., kainite is preferably produced whereas langbeinite is the product when the temperature exceeds 80° C. It is thus possible to select the product obtained by a choice of the temperature.

We have also found that the heterogeneous system of the liquid phase in contact with the precipitate is, in fact, a metastable state or equilibrium which results in the conversion of the metastable precipitated langbeinite after conditioning for a period of several hours into the stable phase, kieserite. A similar transformation also appears to occur with kainite. These minerals all can be recycled to the main recovery plant, from which the potassium-containing brine is obtained, as a source of potassium sulfate.

Also we do not want to be bound to any theory as to the operation of the present invention, it may be noted that the substance whose addition to the solution is essential, is magnesium sulfate, this composition being usable for the present purpose in its anhydrous ($MgSO_4$), hexahydrous ($MgSO_4 \cdot 6H_2O$) or heptahydrous $$(MgSO_4 \cdot 7H_2O)$$

forms. The latter compound will be referred to hereinafter as epsomite. The magnesium sulfate appears to dissolve in the brine and at least partly to react therewith in accordance with the following relationships:

$$3MgSO_4 + 2K^+ \xrightarrow{\text{above 80° C.}} K_2SO_4 \cdot 2MgSO_4 + Mg^{++} \quad (1)$$

$$MgSO_4 + K^+ + Cl^- \xrightarrow{\text{below 80° C.}} KCl \cdot MgSO_4 \cdot 2.75H_2O \quad (2)$$

Moreover, mixtures of the various forms of magnesium sulfate are also suitable.

The quantity of magnesium sulfate to be added to the waste or mother liquors and brine is related to the composition of the brine to be processed since almost all methods for the recovery of potassium salts, from which such brines are derived, give rise to some magnesium sulfate in the brine. Whatever the initial composition of the brine, it has been found to be necessary to add magnesium sulfate in a quantity sufficient to precipitate the langbeinite or kainite and yet not exceed 30 moles of magnesium sulfate per 1000 moles of water.

The brine after removal of the precipitate will have a substantially reduced concentration of potassium, preferably about 2.5 moles of $K_2Cl_2$ per 1000 moles of water (5 moles KCl), and is suitable for recycling to the mineral-processing station in which it can form or be combined with the mother liquor. The magnesium-chloride content of the brine is not of great importance when precipitation of langbeinite is desired and, in fact, the initial concentration of magnesium chloride in the brine can be between 40 and 90 moles per 1000 moles of water if the recycling decantate, after precipitation of langbeinite, is to have a concentration of $K_2Cl_2$ of less than 2.5 moles per 1000 moles of solution. The production of kainite is, however, influenced to a greater extent by the magnesium-chloride concentration, best results being obtained with brines having final concentrations of $MgCl_2$ on the order of 50 to 55 moles per 1000 moles of $H_2O$; in this case, the final concentration of potassium, in terms of $K_2Cl_2$, is about 3.5 moles per 1000 moles of water after precipitation of kainite.

We have further discovered that the addition of a quantity of the mineral to be recovered is helpful not only as a seed but also for the purpose of consolidating the desired equilibrium. The resulting product is surprisingly free from trapped impurities, has the lattice and crystal configurations of the mineral used to prime the precipitation, and is indistinguishable in other respects from this mineral. Moreover, it has been noted that the presence or absence of sodium in the brine has little if any effect upon the precipitation of the potassium salts although the presence of sodium chloride is desirable for economic reasons in that it increases the ionic concentration of the solution and thus reduces the requirements for magnesium sulfate. Since the starting materials are always contaminated with considerable quantities of sodium chloride, even at the commencement of the operation giving rise to the brine, and since the magnesium sulfate itself and the primer minerals may contain considerable quantities of sodium chloride, the brine treated in accordance with the present invention frequently will have a significant concentration of this component. We have, however, found that best results are obtained when the brine contains between substantially 5 and 20 moles of sodium chloride, as $Na_2Cl_2$, per 1000 moles of water and sufficient sodium chloride can be added to maintain this range.

The need for complex equipment is avoided by the present invention since the reactions take place merely upon admixture of magnesium sulfate and, generally, sodium chloride with the brine, preferably in the presence of a relatively large quantity of the mineral and at a temperature of 60 to 80° C. when kainite is desired, and at a temperature between 80° C. and the boiling point of the solution when langbeinite is desired. The primer or seed mineral should be present in an amount by weight ranging between, say, 10 and 40% of the solution treated. The reaction time tends to diminish as the temperature of the reaction increases in accordance with most rate relationships, it being noted that 15 is required to reach the metastable equilibrium for langbeinite at a temperature of 110° C. The equilibrium is maintained for about 4 hours, thereafter the metastable phase of the mineral being converted to the more stable one. At a temperature of about 90° C. the metastable equilibrium is reached after about one hour and is maintained for 12 hours. The corresponding formation times in the metastable equilibrium of kainite may vary from 2 hours at 60° C. to 1 hour at 80° C., the equilibrium being maintained for about 24 hours throughout this temperature range. Upon formation, the kainite and langbeinite may be separated from the respective brines by conventional separation processes, generally decantating, centrifuging or filtering, the term "decanate" being used hereinafter to define the liquid from which the double salt is recovered.

It is thus possible to recover potassium from waste brines having low potassium and magnesium-chloride contents without resorting to evaporation and concentration; there is no need for refrigeration units since precipitation is not effected by cooling of the solution; it is possible to selectively determine the state in which the potassium will be recovered (i.e. either kainite or langbeinite) merely by modifying the temperature and priming composition; there is no need for complex equipment, pressure vessels or the like; and the materials principally added to the liquid are magnesium sulfates which have low cost, are waste products of many processes and are recoverable as the more valuable minerals kainite and langbeinite.

The mother liquors or brines with which the present invention is employed may be produced in many different ways, some of which are described below, these constituting the most common sources, presently employed in the art, of the brines and liquors:

(A) Metathesis cycle for obtaining $K_2SO_4$ from kainite.—A mixture of schoenite and KCl obtained in a first phase of the cycle is reacted with KCl and water, thereby obtaining $K_2SO_4$ and a metathesis brine; the latter is reacted in the first phase of the cycle with the kainite, thus obtaining therefrom schoenite and potassium chloride as well as a conversion brine. This latter brine, which until now was always discarded, is particularly suited for the application of the process of this invention and can be treated in accordance with Examples I–III, infra.

(B) Metathesis cycle for obtaining $K_2SO_4$ from langbeinite.—The leonite obtained from a first stage of the cycle is reacted with KCl and water, thereby obtaining potassium sulphate and a metathesis brine, the latter is reacted in the first phase of the cycle with langbeinite thereby yielding leonite and a conversion brine. The process of this invention (Examples I–III) permits the recovery of considerable quantities of potassium from this latter brine.

(C) Kainite processing cycle through the intermediate formation of langbeinite and subsequent transformation of the langbeinite into potassium chloride and epsomite.— The kainite, impure because of the presence of sodium-chloride contaminants, is treated at temperatures greater than 90° C. with a suitable composition brine to yield a mixture of langbeinite, NaCl and a langbeinite brine, which, after subsequent cooling to temperatures below 40° C., transforms the langbeinite into a mixture of potassium chloride and epsomite; the residual mother liquor may be treated with excellent results by means of the process of this invention (Examples I–III).

(D) Processing cycle of the kainite through the intermediate formation of langbeinite and its subsequent transformation into potassium chloride and schoenite.—The kainite mineral, impure because of sodium-chloride inclusions, is treated at temperatures above 90° C. with a suitable brine, thereby obtaining a mixture of langbeinite and NaCl and a langbeinite brine, the langbeinite of mixture, after subsequent cooling to temperatures lower than 40° C., is transformed into a mixture of potassium chloride and schoenite; the residual mother liquor may be treated with excellent results in accordance with Examples I–III.

(E) Processing cycle for kainitic and carnalitic raw materials to yield KCl and $MgSO_4 \cdot 7H_2O$.—The kainitic mineral is treated with water and/or a brine containing magnesium chloride thereby obtaining a slurry consisting of schoenite and a schoenitic brine. This slurry is reacted carnallite with the ensuing formation of a mixture of $MgSO_4 \cdot 7H_2O$, NaCl and KCl and a residual brine which may be treated with very good results by the process of this invention (Examples I–III).

The kainite and the langbeinite recovered from the brines may be processed separately according to known processes or they may be recycled into the main processing cycle.

The following specific examples of the best made known to us for taking advantage of the invention are given hereunder in order to better and more clearly illustrate the inventive idea.

Example I.—Precipitation of langbeinite 100 grams of brine, in equilibrium with a solid phase consisting of KCl, NaCl and $MgSO_4 \cdot 7H_2O$, is obtained, for example, as a waste brine in the course of a processing operation (E) on kainitic and carnallitic minerals for the production of KCl and $MgSO_4 \cdot 7H_2O$; the brine has a weight-percentage composition: K=1.88%; Na=0.93%; Mg=6.68%; Cl=18.86%; $SO_4$=5.08%; $H_2O$=66.57%, and is treated at a temperature of 110° C. with 14.14 grams of epsomite and 2.86 grams of rock salt; at the same time 20 grams of langbeinite is added as a primer.

After a conditioning time of 15 minutes at 110° C. 26.04 grams of langbeinite (including the recycle) and 110.96 grams of langbeinitic brine of a weight-percentage composition of: K=0.67%; Na=1.85%; Mg=6.64%; Cl=18.56%; $SO_4$=5.77% and $H_2O$=66.51%; were formed.

The solid, separated from the mother liquors, was processed separately or recycled into the main processing cycle.

Example II.—Precipitation of langbeinite 100 grams of brine, in equilibrium with a solid phase consisting of schoenite and KCl as for instance is obtained as a waste brine in the course of a processing operation (D) on kainite minerals for the production of $K_2SO_4$, of a weight-percent composition of: K=2.58%; Na=1.19%; Mg=6.27%; Cl=17.07%; $SO_4$=7.30%; $H_2O$=65.59%, is treated at a temperature of 110° C. with 18.59 grams of epsomite and 3.57 grams of rock salt, while at the same time 20 grams of langbeinite is added as primer.

After a conditioning time of 15 minutes at 110° C. there are formed: 29.29 grams of langbeinite (including the recycle) and 112.67 grams of a langbeinitic brine having a weight-percent composition of: K=0.73%; Na=2.23%; Mg=6.23; Cl=16.96%; $SO_4$=7.19% and $H_2O$=66.66%.

The solid separated from the mother liquors was either processed separately according to known methods or it is recycled into the main processing operation.

Example III.—Precipitation of kainite 100 grams of brine, in equilibrium with a solid phase consisting of KCl, NaCl and $MgSO_4 \cdot 7H_2O$, such as was obtained as a waste brine in the course of a processing operation (E) on kainitic and carnallitic minerals for the production of KCl and $MgSO_4 \cdot 7H_2O$, having a weight percent composition of: K=1.88%; Na=0.93%; Mg=6.68%; Cl=18.86%; $SO_4$=5.08; $H_2O$=66.57%, is treated at a temperature of 80° C. with 24.14 grams of $MgSO_4 \cdot 7H_2O$ and 3.40 grams of rock salt; at the same time 20 grams of kainite is added as a primer. After a conditioning time of one hour at 80° C. there were formed: 24.28 grams of kainite (including the recycle) and 123.26 grams of kainitic brine of a weight percent composition of: K=0.97; Na=1.84%; Mg=7.01%; Cl=16.46%; $SO_4$=10.39% and $H_2O$=63.32%.

The solid, separated from the mother liquors, was either processed separately, according to known processes, or was recycled into the main processing cycle.

We claim:

1. A process for removing potassium as a double salt selected from the group consisting of kainite and langbeinite from an aqueous liquid containing potassium ion in an amount of at least 8 moles per 1000 moles of water and constituted of final liquors, brines and waste liquid used in the treatment of potassium-containing minerals, comprising the steps of:

(a) dissolving anhydrous hexahydrate or heptahydrate magnesium sulfate in said liquid in an amount not exceeding 30 moles per 1000 moles of water and sufficient to precipitate therefrom a substantial part of the potassium originally present in said liquid as a metastable kainite or langbeinite potassium-magnesium double salt;

(b) adding to the solution produced in step (a) a seed mineral of potassium and magnesium selected from the group consisting of langbeinite when langbeinite is the desired product and kainite when kainite is the desired product whereby the double salt precipitates from said liquid and deposits upon said seed mineral with essentially the same crystallographic configuration as that of said seed mineral, (c) maintaining the solution and seed mineral of step (b) at a temperature of 60° C. to 80° C. when kainite is the desired product and at a temperature of above 80° C. when langbeinite is the desired product for a period sufficient to precipitate said double salt; and (d) separating said double salt from said liquid without evaporation thereof.

2. The process defined in claim 1 wherein said liquid is a mother liquor of a process for the extraction of simple potassium salts from mineral double salts containing potassium, magnesium, chloride and sulfate ions.

3. The process defined in claim 2 wherein a quantity of sodium chloride is added to said liquid sufficient to bring the sodium-chloride concentration of said liquid, in terms of $Na_2Cl_2$, between substantially 5 and 20 moles per 1000 moles of $H_2O$.

References Cited
UNITED STATES PATENTS

| | | | |
|---|---|---|---|
| 2,687,339 | 8/1954 | Dancy et al. | 23—38 |
| 2,804,371 | 8/1957 | Dancy et al. | 23—38 |
| 2,809,093 | 10/1957 | Dancy | 23—121 X |
| 2,862,788 | 12/1958 | Stanley et al. | 23—121 X |
| 2,881,050 | 4/1959 | Autenrieth | 23—121 X |
| 3,110,561 | 11/1963 | Henne et al. | 23—38 X |
| 3,203,757 | 8/1965 | Henne et al. | 23—121 |

HERBERT T. CARTER, Primary Examiner

U.S. Cl. X.R.

23—38, 117